(No Model.)
S. H. WALTON.
PLOW.
No. 432,103. Patented July 15, 1890.
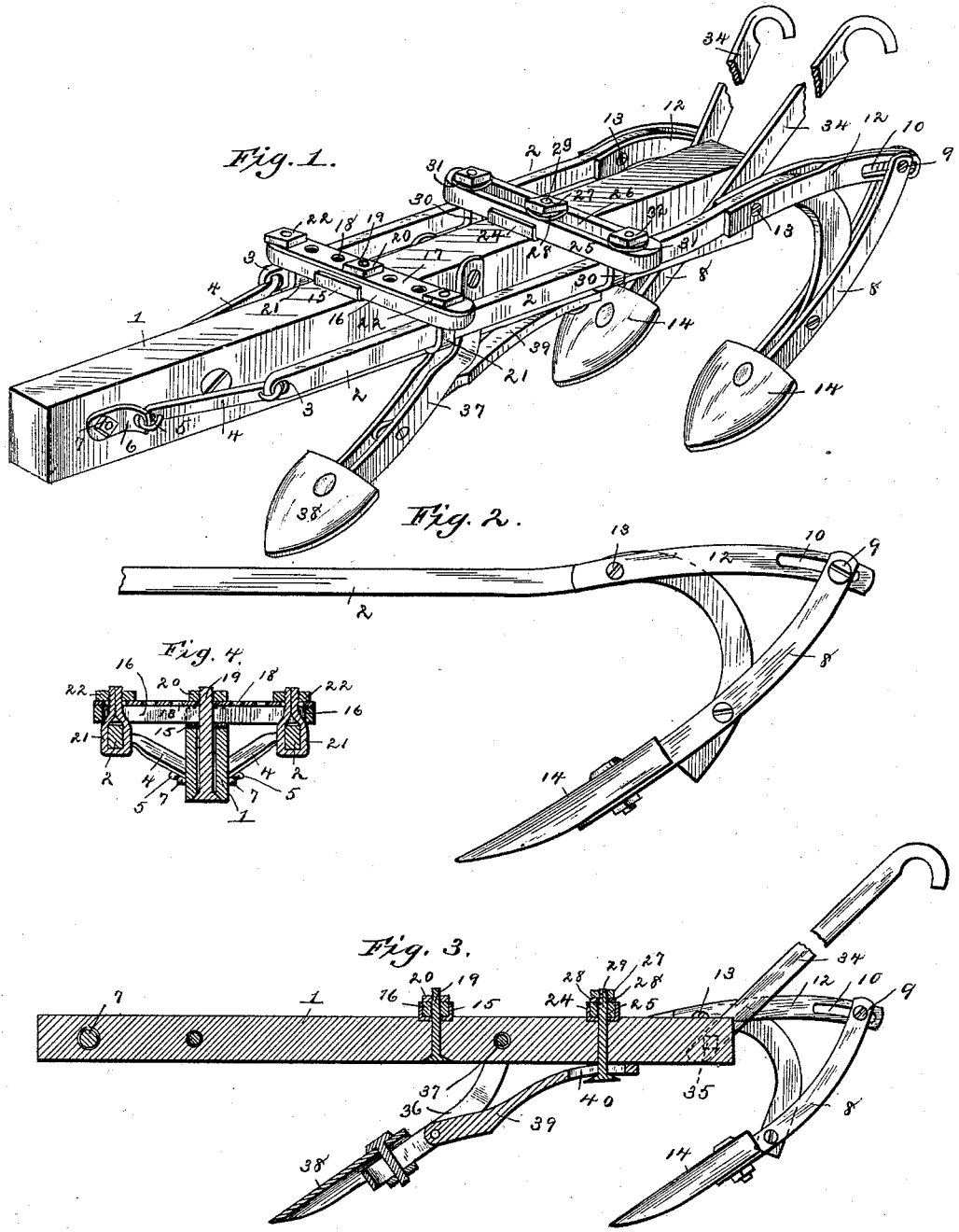
Witnesses:
Harry L. Amer
W. S. Duvall
Inventor
Sam H. Walton.
By his Attorneys
C. A. Snow & Co.

UNITED STATES PATENT OFFICE.

SAM HOUSTON WALTON, OF BELTON, TEXAS.

PLOW.

SPECIFICATION forming part of Letters Patent No. 432,103, dated July 15, 1890.

Application filed April 3, 1890. Serial No. 346,467. (No model.)

*To all whom it may concern:*

Be it known that I, SAM HOUSTON WALTON, a citizen of the United States, residing at Belton, in the county of Bell and State of Texas, have invented a new and useful Plow, of which the following is a specification.

This invention has relation to plows, and among the objects in view are to combine a single and double plow so that they may be used either conjointly or independently of each other, and to provide means for the ready adjustment of the plow-beams with relation to each other and for the adjustment of the shovels so as to present the same at different inclinations for penetrating the ground at various depths.

With the above general objects in view the invention consists in certain features of construction, hereinafter specified, and particularly pointed out in the claims.

Referring to the drawings, Figure 1 is a perspective of a plow and cultivator combined constructed in accordance with my invention. Fig. 2 is a detailed view in side elevation of one of the plow-beams. Fig. 3 is a longitudinal vertical section. Fig. 4 is a transverse section.

Like numerals of reference indicate like parts in all the figures of the drawings.

1 represents the draft-beam, and 2 the opposite plow-beams arranged at each side of the draft-beam. The ends of the plow-beams are provided with eyes 3, which by links 4, terminating in hooks 5, engaging the eyes, are connected to perforated plates 6, one arranged at each side of the beam and secured in position by bolts 7. The plate 6 at one side of the beam is arranged in advance of the companion plate at the opposite side of the beam.

The rear ends of the plow-beams 2 are downwardly curved in goose-neck fashion and have pivoted at their lower ends a bifurcated plow-standard 8, the upper ends of which are connected by a set-bolt 9, which passes through a longitudinal slot 10 in the rear free end of a bifurcated adjusting-arm 12, the front end of which embraces the beam 2 and is pivoted thereto, as at 13. In the lower slotted end of the plow-standards are mounted the shovels 14, said shovels being adjustable within the standards. By loosening the set-bolt 9 the standards 8 may be swung upon their pivots, thus presenting the shovels and themselves at varying angles with relation to the ground, and may be secured in any of their adjustments by simply retightening the bolts in the slots. In these pivotal movements of the standards it will be observed that the slotted arms 12 will swing upon their pivots, so as to accommodate their free ends to the heights of the standards.

Located upon the beam 1 near the front of the shortest plow-beam is a U-shaped plate 15, in which is seated a transversely-disposed bar 16, having a slot throughout its length, and mounted upon the bar is an adjusting-plate 17, provided with a series of bolt-openings 18. Through the central bolt-opening and the beam there passes a bolt 19, secured in place by a binding-nut 20. Through the outer bolt-openings passes a J-shaped bolt 21, the upper ends of which are provided with nuts 22, the lower J-ends of the bolts being inwardly disposed and supporting the plow-beams 2. It will thus be observed that the plow-beams are pivotally connected at their front ends and that their fulcrums may be changed by inserting the J-shaped bolt in any of the remaining perforations 18.

In rear of the fulcrums of the beams there is arranged upon the central draft-beam 1 a second U-shaped plate 24, seated in which is a second transversely-disposed bar 25, having a longitudinally-disposed slot 26, extending throughout the length of the same. A bolt 27 passes through a washer 28, seated upon the upper edge of the bar 25, and through the beam 1, and upon the bolt is mounted a set-screw 29. In the opposite ends of the slot 26 are mounted J-shaped bolts 30, which pass through the slots and through washer-plates 31, and are provided with binding-nuts 32; the lower J-ends of the bolts supporting the beams 2. By manipulating the J-shaped bolts last described the rear ends of the plow-beams may be adjusted into or out of parallelism, as will be apparent, the fulcrums of the beams remaining the same or being varied, as before described.

34 represents the opposite handles, of ordinary construction, bolted, as at 35, to the rear end of the draft-beam, and which, if desired, may be bolted to the plow-beams 2 in case said beams are used.

36 represents a bifurcated plow-standard bolted at its upper ends, as at 37, said upper ends embracing the opposite sides of the beam 1 and located at about the center of the beam. A shovel 38 is adjustably mounted in the lower end of the standard, and the standard is braced by an inclined brace 39, one end of which is secured to the standard, and the rear end of which is slotted, as at 40, and receives the lower end of the central bolt, which passes through the bar 25. The upper end of the standard 36 being pivoted, it is apparent that said standard may be adjusted by means of the slot and bolt just described.

If desired, the side beams may be removed, as will be apparent from the described construction, and the plow used as an ordinary single plow, and also by employing the side beams said plow may be converted into a cultivator, adapted for the cultivation of corn.

Having thus described my invention, what I claim is—

1. The combination, with the central beam, of the front and rear adjusting-plates, J-shaped bolts depending therefrom, opposite plow-beams suspended from the bolts and terminating at their front ends in eyes and links, connecting said eyes to the central beam, substantially as specified.

2. The combination, with the central beam and the front and rear U-shaped plates, of the slotted bars mounted in the plates, the perforated plate mounted in the front bar, the central binding-bolts passing through the bars and the beam, and the opposite pairs of J-shaped bolts adjustably mounted in the plate of one bar and the slot of the other bar, the opposite side plow-beams mounted in the J-shaped bolts and loosely connected at their front ends to the central beam, substantially as specified.

In testimony that I claim the foregoing as my own I have hereto affixed my signature in presence of two witnesses.

SAM HOUSTON WALTON.

Witnesses:
SILAS BAGGETT,
J. Z. MILLER.